Sept. 13, 1966  C. W. WHEELER  3,271,974
CARBONATING AND DISPENSING APPARATUS
Filed Oct. 16, 1964  2 Sheets-Sheet 1
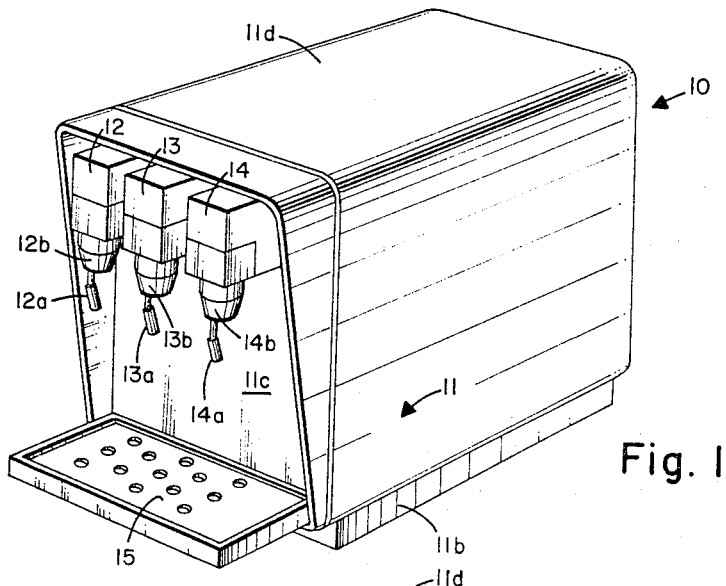
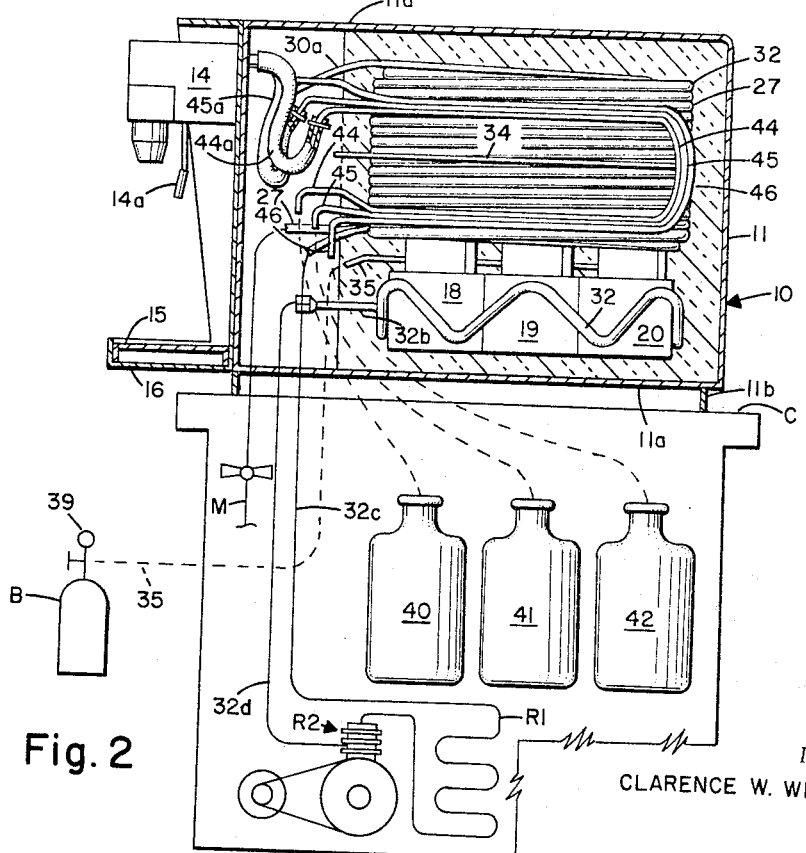
INVENTOR
CLARENCE W. WHEELER
BY
ATTORNEY Sept. 13, 1966   C. W. WHEELER   3,271,974
CARBONATING AND DISPENSING APPARATUS
Filed Oct. 16, 1964   2 Sheets-Sheet 2
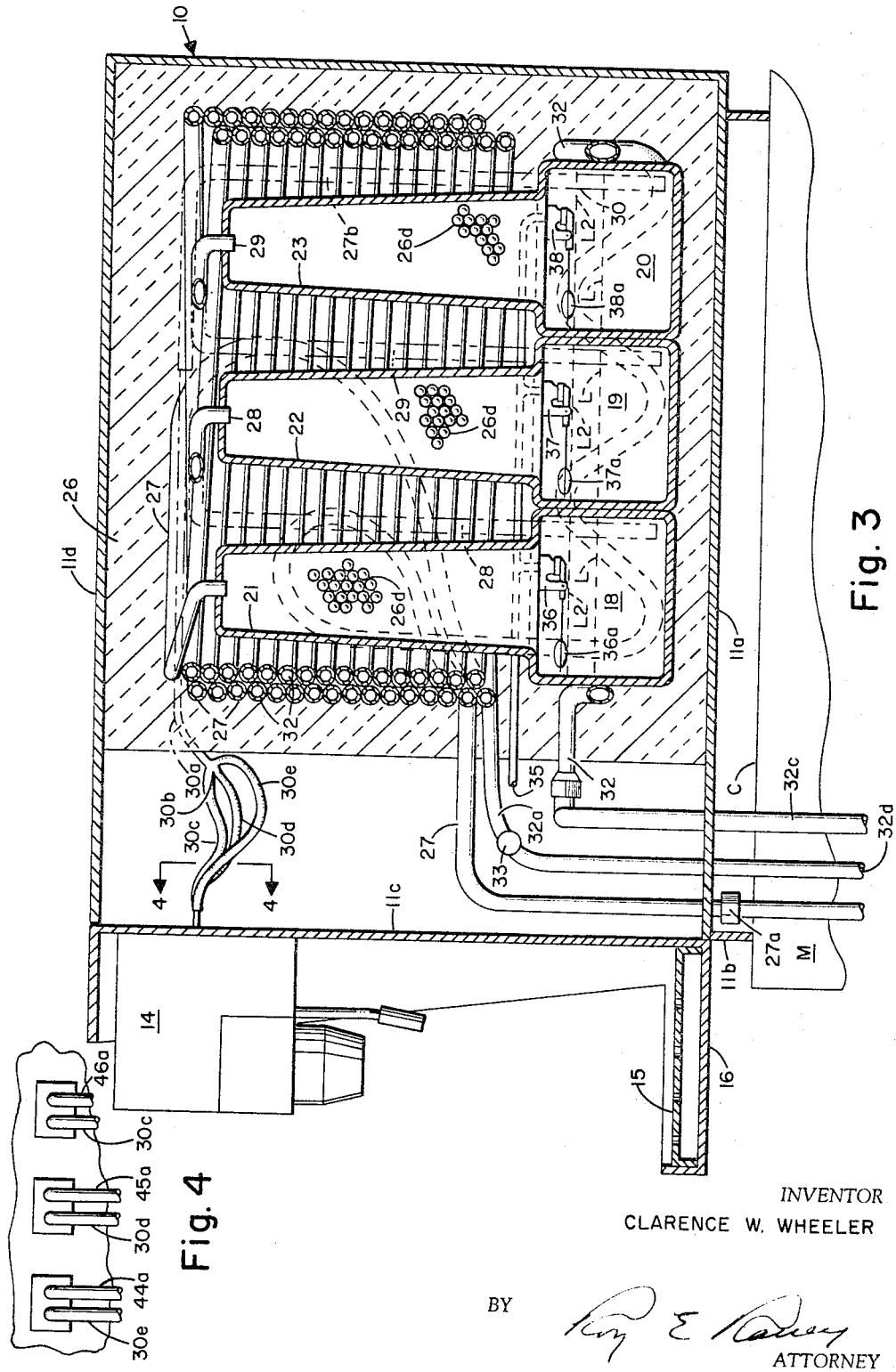
INVENTOR
CLARENCE W. WHEELER
BY
ATTORNEY

United States Patent Office 3,271,974
Patented Sept. 13, 1966

3,271,974
CARBONATING AND DISPENSING APPARATUS
Clarence W. Wheeler, 1767 41st St. S.,
St. Petersburg, Fla.
Filed Oct. 16, 1964, Ser. No. 404,411
1 Claim. (Cl. 62—395)

The present invention relates to an improved apparatus for dispensing flavored carbonated water as a chilled beverage.

An object of the present invention is the provision of a compact and efficient apparatus for carbonating water and mixing a flavoring extract with the carbonated water as it is discharged into a drinking container or the like, means being provided for refrigerating the water prior to and after carbonation and also chilling the flavoring extract prior to introducing it into the carbonated water whereby the individual servings of beverages are highly carbonated and refreshingly chilled without the use of ice. The carbonation of the water is enhanced by chilling the water prior to subjecting it to $CO_2$ gas, and it is unnecessary to supply ice in the container in which the drink is dispensed for providing a satisfyingly cool beverage.

Other objects and advantages of the invention will become apparent from the following detailed description of a preferred form of the invention, reference being made to the accompanying drawings, wherein:

FIG. 1 is a perspective view of a carbonated beverage dispenser embodying the invention;

FIG. 2 is a longitudinal partial sectional view of the dispenser and a diagrammatic showing of a refrigeration system associated therewith;

FIG. 3 is a view similar to FIG. 2 but on a larger scale and showing certain other parts in section; and FIG. 4 is a fragmentary sectional view taken along line 4—4 of FIG. 3.

A preferred embodiment of the invention is illustrated in the drawings which show a soft drink dispenser 10 for dispensing three different flavors of carbonated beverages, although more or fewer flavors could be provided for. Dispenser 10 comprises a casing 11 of suitable construction, such as stainless steel, including a bottom wall 11a supported by a rectangular base structure 11b, which may rest on a suitable surface such as a counter top C. Casing 11 also includes an upright front wall 11c rigidly attached to bottom wall 11a in any suitable fashion, and a cover 11d having a rear, top and side wall detachably secured to the base structure by convenient means, not shown. Front wall 11c has three beverage dispensing valves 12, 13 and 14 supported thereon which project forwardly from the top portion thereof, and a perforated drain board 15 is supported below these valves through which spillage may drain off through a suitable opening (not shown) in a bottom panel 16.

Carbonated water and flavoring extracts are supplied to the respective dispensing valves 12, 13 and 14 by mechanism located rearwardly of front wall 11c and enclosed within cover 11d. The dispensing valves shown are operated by electric solenoids which are controlled by switch operating levers 12a, 13a and 14a, respectively, and which open the respective valves when the levers are tilted rearwardly by the placement of a cup or other container under either of the outlet spouts 12b, 13b and 14b. Valves and control circuits therefor of the type referred to are well known and it is deemed unnecessary to the understanding of this invention to describe and show them in detail.

The mechanism for carbonating the water and supplying extract comprises three stainless steel tanks 18, 19 and 20 which are generally rectangular and each of which has a tapered circular cascade domes 21, 22 and 23, respectively. The tanks are heliarc welded together as a unit and are embedded in insulation material 26, such as expanded polystyrene supported on bottom wall 11a. The cascade domes each contain a bed of marbles 26d or like particulate material to provide a multiplicity of tortuous passages so that water entering the top of the domes is broken up into fine streams as it passes downwardly through the beds thereby causing a more ready absorption of $CO_2$ gas present in the domes, as is explained more fully hereinafter. The beds of marbles are retained in place by screens, not shown.

Water from a convenient source, such as a city water main M, is fed into the top of dome 21 through one end of a copper pipe 27, the other end of which is connected to the main through a check valve 27a which prevents back flow of water from the pipe to the main. Pipe 27 is coiled in an oval, double helix form 27b which surrounds domes 21, 22 and 23 and is intercoiled with a refrigerant evaporator tubing 32, as is explained more fully hereinafter. The portion of tube 27 adjacent to the outlet end thereof extends from the bottom of the helix to the top of dome 21 into which the pipe empties so as to cause the water to trickle through the bed of marbles 26d into tank 18. Water is fed from the lower portion of tank 18 into the top of dome 22 through a tube 28, one end of which is disposed near the bottom of tank 18 and the upper end of which empties into the top of dome 22 so that water discharged into the dome trickles downwardly through the bed of marbles 26 therein and into tank 19. Water is fed from the lower portion of tank 19 into dome 23 through a pipe 29 one end of which extends from adjacent the bottom of tank 19 upwardly and empties into the top of dome 23. It will be understood that suitable hermetic seals are formed between the tubes 27, 28 and 29 and the edges of the openings in tanks 18 and 19 through which the tubes extend so as to retain gas under appreciable pressure within the tank and dome structures. Water is fed from tank 20 to the distributor valves 12, 13 and 14 through a tube 30 which extends from adjacent the bottom of tank 20 upwardly through an opening in the tank and laterally to a reduced diameter portion 30a which is connected to a three branch connection 30b the branches thereof leading to the respective valves by lines 30c, 30d and 30e. The space between the tube 30 and the edges of the opening through which the tube extends is suitably sealed.

Water flowing through coil 27b is chilled by the evaporator coils 32 of a conventional electric motor driven compressor-condenser-evaporator refrigerator system R, and which evaporator coil has its convolutions intertwined with coiled tubing 27 so that each convolution of refrigerant coil is engaged by one or more of the water carrying convolutions. Preferably the convolutions of coiled tube 27 and coil 32 are dipped in solder to achieve a close heat exchange relationship. Coil 32 is supplied at its end 32a with liquid refrigerant through a suitable capillary expansion valve 33 connected with the condenser R1 of the refrigerating system through tube 32c, and the other end 32b of the evaporator coil is connected with the intake of the refrigerant compressor R2 through tube 32d. The portion of coil 32 adjacent the outlet end is soldered to the tanks 18, 19 and 20, as shown, to maintain the water therein cold. The compressor, its electric drive motor and condenser is shown beneath the counter C and is controlled by a conventional thermostatic switch, not shown, having a thermal sensing tube 34 clamped to coil 32 so that the water temperature passing through coil portion 27b will be relatively cold. The thermostatic control is not shown as such control devices are well known. The coils described are embedded in the body of insulation 26 which completely encases the coils as well as the tanks 18, 19 and 20, as seen in FIG. 3.

$CO_2$ gas is fed to tanks 18, 19 and 20 through a tube 35 connected to a bottle B of $CO_2$ gas and which has branches at each tank leading to float valves 36, 37 and 38 located in the respective tanks. Preferably, a pressure regulator 39 is provided between the gas bottle and inlet valves 36, 37 and 38 which maintains a gas pressure at those valves higher than the water pressure from the water main source but less than the pressure normally carried in the gas bottles. Valves 36, 37 and 38 are operated by floats 36a, 37a and 38a which are arranged to close the respective valves when the water level in each tank falls to a minimum level L, so that the interruption of the gas supply and the absorption of the gas by the water will result in a reduction in the pressure below that of the water supply and fresh water will then be admitted into the dome above the tank having the low level. The chilled water entering the domes cascades or trickles down through the marble beds and readily absorbs $CO_2$ present in the domes and as the water level in the tanks rises to an upper level L2 the valves 36, 37 or 38 open to admit gas to the respective tanks and domes. It will be seen that the water to be carbonated is passed through three of the beds of marbles 26d to thoroughly carbonate the water as it moves to the dispensing valves 12, 13 and 14. This system of gas control for the carbonating of water described is similar to that disclosed in U.S. Patent No. 2,527,679.

Liquid flavoring extracts are fed to the dispensing valves 12, 13 and 14 from containers 40, 41 and 42 which are each connected to a separate dispensing valve by suitable relatively small diameter stainless steel tubes 44, 45 and 46 respectively, which are soldered in close heat exchange relationship to the outer sides of the evaporator coil 32 and the outlet ends of which are connected by flexible tubes 44a, 45a and 46a to the respective dispenser valves. For sake of clarity, tubes 44a, 45a and 46a are not shown in FIG. 3. The valves 12, 13 and 14 are of the type which draw the liquid flavor into the stream of water passing through the respective valves so that the discharged water is properly flavored. As mentioned previously, valves of the type referred to are well known and further description thereof is unnecessary to the understanding of the invention. It will be seen that the extract is chilled as it slowly passes through the tubes 44, 45 and 46, and this together with the fact that the water is likewise chilled results in a refreshingly cold drink being dispensed from the valves 12, 13 or 14. By chilling the water passing to the carbonating domes and tanks, the ability to absorb and retain $CO_2$ gas is increased so that a desirable highly carbonated water is provided which retains most of its carbon dioxide content in transferring into the consumer's cup. Thus, an auxiliary ice supply is unnecessary in dispensing drinks from the fountain.

Although but one form of the invention has been described other forms, modifications, and adaptations may be made, all falling within the scope of the claim which follows.

Having described my invention, I claim:

In a carbonated beverage dispensing apparatus, a housing, a water carbonating structure in said housing and comprising a vertically extending dome enclosing a water dispersing bed and a water collecting tank beneath said dome and forming a closure therewith, conduit means for discharging $CO_2$ gas into said bed, conduit means for discharging water into the top of said dispersion bed and including a coil of tubing in said housing and surrounding said dome, a cooling element comprising a coil of tubing extending in heat exchange relation with the walls of said tank and in heat exchange relation with the first mentioned coil throughout the length thereof for chilling water supplied to said bed structure, a dispensing valve means supported by said housing, a water conducting tube interconnecting said tank of said carbonating structure and said dispenser, tube means for supplying extract to said valve means, the last mentioned tube means having a portion thereof in heat exchange relation with said cooling element, and insulation means in said housing enclosing said coils and carbonating structure.

References Cited by the Examiner

UNITED STATES PATENTS

| | | | |
|---|---|---|---|
| 2,749,096 | 6/1956 | Cole | 62—395 X |
| 2,956,418 | 10/1960 | McCann | 62—394 X |
| 2,978,143 | 4/1961 | Arnett et al. | 62—399 X |
| 3,009,337 | 11/1961 | Johnson | 62—394 X |

LLOYD L. KING, *Primary Examiner.*